US012253792B1

(12) United States Patent
Zhang

(10) Patent No.: US 12,253,792 B1
(45) Date of Patent: Mar. 18, 2025

(54) LIGHTWEIGHT AI-INTERACTIVE-AIDED PHOTOGRAPHING DEVICE

(71) Applicant: Shenzhen Reverse Krypton Technology Co., Ltd., Shenzhen (CN)

(72) Inventor: Liqiong Zhang, Shenzhen (CN)

(73) Assignee: Shenzhen Reverse Krypton Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/896,836

(22) Filed: Sep. 25, 2024

(30) Foreign Application Priority Data

Jul. 18, 2024 (CN) .......................... 202421705093.3

(51) Int. Cl.
*G03B 15/07* (2021.01)
*G03B 17/56* (2021.01)
*G10L 15/22* (2006.01)

(52) U.S. Cl.
CPC ........... *G03B 15/07* (2013.01); *G03B 17/561* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 11,496,654 B2 | 11/2022 | Zhang | |
| 11,619,338 B2 | 4/2023 | Guo et al. | |
| 11,746,967 B1* | 9/2023 | Li | F21V 23/04 362/217.1 |
| 11,755,069 B2* | 9/2023 | Andres | G06F 1/1626 455/575.8 |
| 12,099,382 B1* | 9/2024 | Shi | G06F 1/1626 |
| 2018/0292052 A1* | 10/2018 | Wessel | F21V 15/013 |
| 2024/0361678 A1* | 10/2024 | Liang | G03B 17/561 |

* cited by examiner

*Primary Examiner* — Rodney E Fuller
(74) *Attorney, Agent, or Firm* — Ricky Lam

(57) ABSTRACT

The present disclosure provides a lightweight AI-interactive-aided photographing device, comprising a base part, a main rod part, a mounting part, and a mounting member. The mounting member is an LED fill light or a display screen, and a flat plate fixing panel is built in the LED fill light. The base part comprises a base, a switch, an AI voice module, a speaker, a control plate, a base cover plate, and a support member. The main rod part comprises an upper and lower rod sleeving member, an upper main rod, a lower main rod, a lower rod fixing member, a fixing cover plate, a light plate, an acrylic diffusion plate, and a light plate clamping member. The mounting part comprises a fixing member, a damping rotating shaft, and a coil spring.

5 Claims, 6 Drawing Sheets

LIGHTWEIGHT AI-INTERACTIVE-AIDED PHOTOGRAPHING DEVICE

CLAIMS OF PRIORITY

This patent application claims priority from:
(1) CN utility model patent application number is 202421705093.3 with a filing date of Jul. 18, 2024 and DAS code of 411B.

TECHNICAL FIELD

The present utility model belongs to the technical field of photo-booth photography, and particularly relates to a lightweight AI-interactive-aided photographing device.

BACKGROUND

The conventional photographing interaction of an interactive photographing device is to photograph by use of a camera with a display screen and realize the facial capture by virtue of the fill light function that comes with the camera. In terms of design and function, the existing interactive photographing devices suffer from the following defects: tools are required to disassemble and assemble such parts of the traditional interactive photographing devices as a light plate and a diffusion plate, which increases the difficulties in the daily assembly, disassembly, and maintenance on the part of users; the devices are only applicable to tablet computers in specific sizes, which limits the serviceable range of the products and reduces the service efficiency; in addition, the existing interactive photographing devices lack intelligent control, so that the user experience in terms of functions such as taking photos and videos, controlling light, and playing music is not convenient, fast, or efficient enough. To this end, a lightweight AI-interactive-aided photographing device is proposed.

SUMMARY

It is an objective of the present utility model to provide a lightweight AI-interactive-aided photographing device, which is designed to solve the problems raised in the background art.

An embodiment in the present utility model is realized in such a way: a lightweight AI-interactive-aided photographing device, comprising a base part, a main rod part, a mounting part, and a mounting member, wherein the mounting member is an LED fill light or a display screen, and a flat plate fixing panel is built in the LED fill light;

the base part comprises:
a base;
a switch, which is arranged in the base;
an AI voice module, which is arranged in the base and used to capture, analyze, and process linguistic input to create instructions; wherein the AI voice module comprises a pickup unit and a voice recognition unit, the pickup unit is used to capture speeches or sounds, and the voice recognition unit is used to receive sound data from the pickup unit, analyze and process the sound data, convert recognition results into instructions, and transmit the instructions to a control plate;
a speaker, which is arranged in the base;
a control plate, which is arranged in the base;
a base cover plate, which is arranged in a lower end of the base;
a support member, which is fixed to a lower end of the base cover plate;

the main rod part comprises:
an upper and lower rod sleeving member;
a main rod, which comprises an upper main rod and a lower main rod, wherein the upper main rod and the lower main rod are fixedly sleeved at both ends of the upper and lower rod sleeving member respectively and fixed by screws;
a lower rod fixing member, which has a lower end that is fixedly arranged on the base and an upper end that is in inserted connection with the lower main rod;
a fixing cover plate, which is mounted at a top end of the upper main rod;
a light plate and an acrylic diffusion plate, which are fixed through mounting slots that are arranged in the main rod;
a light plate clamping member, which is fixedly mounted on an inner side of the upper main rod and used to fix the light plate and the acrylic diffusion plate in the upper main rod;

the mounting part comprises:
a fixing member, at both ends of which two screw bearings are arranged, wherein the screw bearings have a size in line with the mounting slots of the main rod;
a damping rotating shaft, through which the mounting member is mounted on the fixing member, wherein a rotational limit design is arranged on a back face of the mounting member;
a coil spring, which is arranged on a rear side of the mounting member, configured to be adapted to the weight of the mounting member, and used in cooperation with the screw bearings on both sides of the fixing member.

Further, the support member is a wheel or a foot cup.

Further, fixing holes at both ends of the upper main rod and the lower main rod are suitable for fixing the lower rod fixing member, the upper and lower rod sleeving member, and the fixing cover plate.

Further, the upper and lower rod sleeving member and the light plate clamping member are provided with fixing slots for the light plate and the acrylic diffusion plate.

Further, strokes of ascent and descent of the fixing member is difference between mounting heights of the fixing cover plate and the light plate clamping member.

Compared with the prior art, the beneficial effects of the present utility model are as follows:
1. the light plate and the acrylic diffusion plate in the main rod of the device can be assembled and disassembled without tools, which enables a user to easily assemble and disassemble the device, and facilitates daily cleaning and maintenance.
2. when the LED fill light is used, the device is applicable to tablet computers in multiple sizes, which improves the service efficiency of the product.
3. the device is integrated with a control plate, an AI voice module, and a speaker; the AI voice module has a pickup unit and a voice recognition unit; the pickup unit captures speeches or sounds; then, the speeches or sounds are transmitted to the voice recognition unit for analysis and processing to create instructions; subsequently, the instructions are transmitted to the control plate; a user can control the product through voice instructions to perform functions, such as taking photos and videos, turning on or off the light, playing music, checking the weather, viewing news in real time, adjusting the brightness, and changing colors; the convenience, efficiency, and personalized services of the AI voice control greatly improve the service efficiency of the product, enrich the scenario application, and achieve a more perfect human-computer interaction experience.

4. the device makes use of the screw bearings in cooperation with the coil spring; the fixing member can slide up and down in a main rod groove through the screw bearings on both sides thereof, and can make the product ascend, descend, and stop arbitrarily within a certain height in the presence of the tensile resistance of the coil spring; the operation is more humanized and more convenient.

Figure 1:
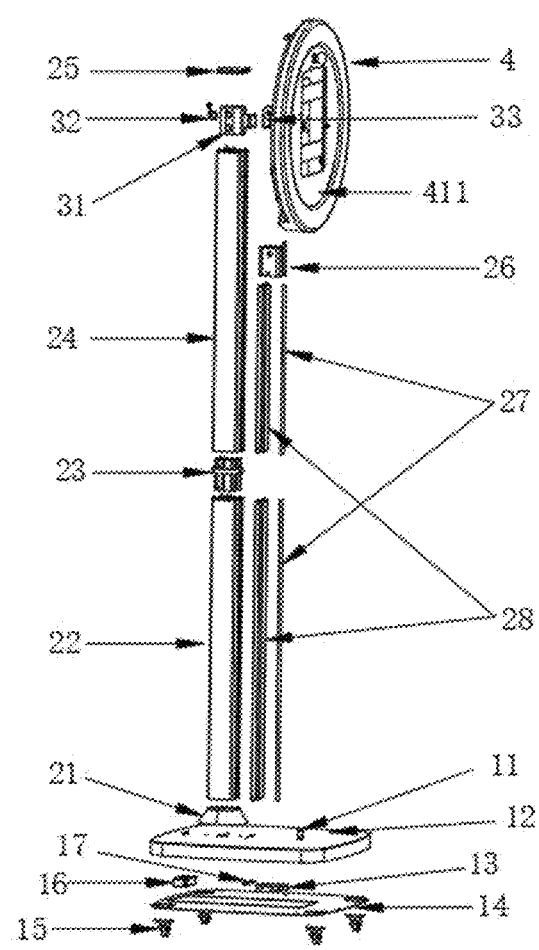
FIG. 1 is an exploded view of a lightweight AI-interactive-aided photographing device.

In the figure: switch 11, base 12, control plate 13, base cover plate 14, support member 15, speaker 16, AI voice module 17, lower rod fixing member 21, lower main rod 22, upper and lower rod sleeving member 23, upper main rod 24, fixing cover plate 25, light plate clamping member 26, acrylic diffusion plate 27, light plate 28, fixing hole 29, fixing member 31, coil spring 32, damping rotating shaft 33, mounting member 4, LED fill light 41, flat plate fixing panel 411, display screen 42.

DESCRIPTION OF EMBODIMENTS

To make the objective, technical solution, and advantages of the present utility model clearer, the present utility model is further described below in detail in combination with the drawings and embodiments. It should be understood that the specific embodiments described herein only serve to explain the present utility model, rather than limit the present utility model.

The specific realization of the present utility model is described below in detail in combination with specific embodiments.

As shown in FIGS. 1-4, one embodiment of the present utility model provides a lightweight AI-interactive-aided photographing device, comprising a base part, a main rod part, a mounting part, and a mounting member 4; the mounting member 4 is an LED fill light 41 or a display screen 42; a flat plate fixing panel 411 is built in the LED fill light 41; the whole device is further additionally equipped with a plurality of flat plate fixing panels 411, which are suitable for fixing tablet computers in multiple sizes, including but not limited to 10.2-inch ones, 10.5-inch ones, 10.9-inch ones, 11-inch ones, 12.9-inch ones, and 13-inch ones; they can be replaced to use, which increases the compatibility of the product in use.

As shown in FIG. 1, as a preferred embodiment of the present utility model, the base part comprises:

a base 12;

a switch 11, which is arranged in the base 12;

a control plate 13, which is arranged in the base 12;

an AI voice module 17, which is arranged in the base 12 and used to capture, analyze, and process linguistic input to create instructions; wherein the AI voice module 17 comprises a pickup unit and a voice recognition unit, the pickup unit is used to capture speeches or sounds, and the voice recognition unit is used to receive sound data from the pickup unit, analyze and process the sound data, convert recognition results into instructions, and transmit the instructions to the control plate 13;

a speaker 16, which is arranged in the base 12;

a base cover plate 14, which is fixed to a lower end of the base 12;

a support member 15, which is fixed to a lower end of the base cover plate 14; wherein the support member 15 is a wheel or a foot cup, and the wheel facilitates moving the product when used.

In the embodiment of the present utility model, the AI voice module 17 has a voice wake-up function, which can capture, analyze, and process a user's speech or sound input. The working process is as follows: the pick-up unit first captures speeches or sounds of a user and transmits these sound data to the voice recognition unit; the voice recognition unit analyzes and processes these sound data, converts them into specific instructions, and subsequently transmits the instructions to the control plate 13; the control plate 13 performs corresponding operations according to the received instructions. As such, through the voice instructions, the user can control the product to perform various operations, such as taking pictures and videos, turning on or off the light, playing music, checking the weather, viewing news in real time, adjusting the brightness, and changing colors. In addition, the AI voice module 17 can control the overall light of the product through the control plate 13 in multiple aspects, such as turning it on or off, increasing or decreasing the brightness, and changing the color, which greatly increases the usage and operation scenarios of the user and improves the convenience. A door plate is arranged on the base cover plate 14, which facilitates quick installation and maintenance.

Figure 2:
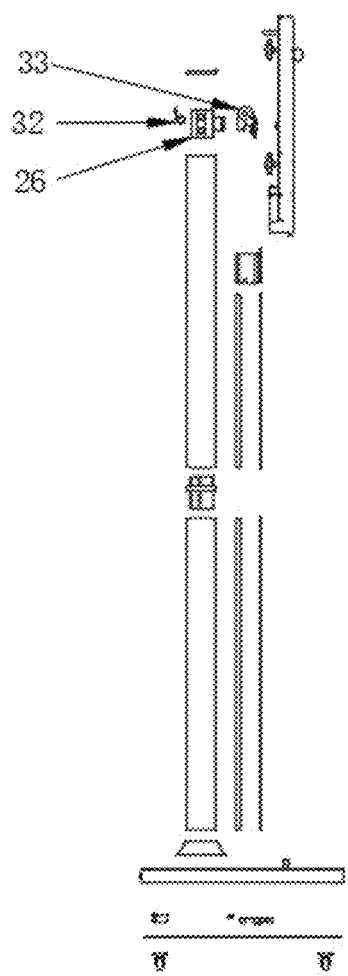
FIG. 2 is a side view of the lightweight AI-interactive-aided photographing device in FIG. 1.
Figure 3:
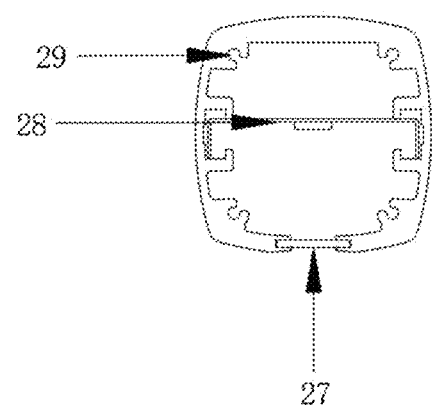
FIG. 3 is a cross-sectional mounting view of the main rod in the lightweight AI-interactive-aided photographing device.
Figure 4:
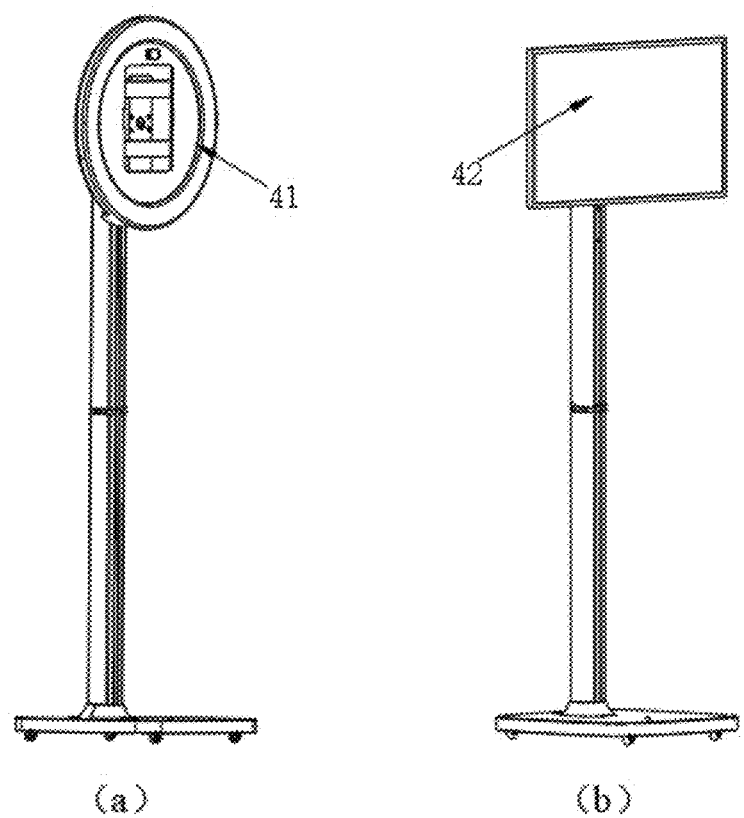
FIG. 4 is a structure diagram of the lightweight AI-interactive-aided photographing device; wherein (a) is a structure diagram of the mounting member with an LED fill light, and (b) is a structure diagram of the mounting member with a display screen.
Figure 5:
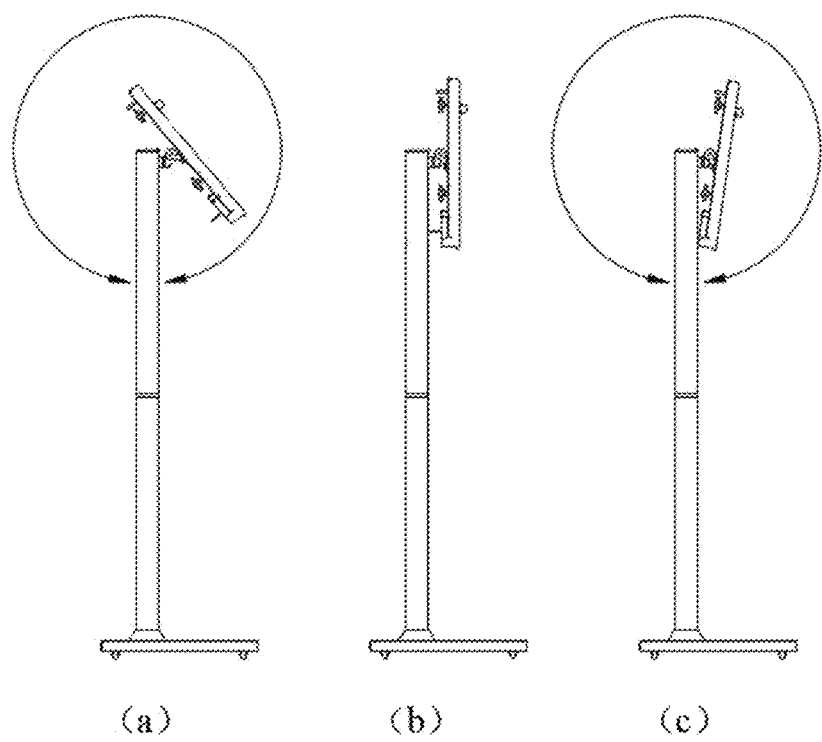
FIG. 5 is a structure diagram of the mounting member that is subject to backward and forward rotational adjustments in the lightweight AI-interactive-aided photographing device; wherein (a) is a state diagram of the mounting member rotated backward, (b) is a state diagram of the mounting member without backward or forward rotational adjustment, and (c) is a state diagram of the mounting member rotated forward.
Figure 6:
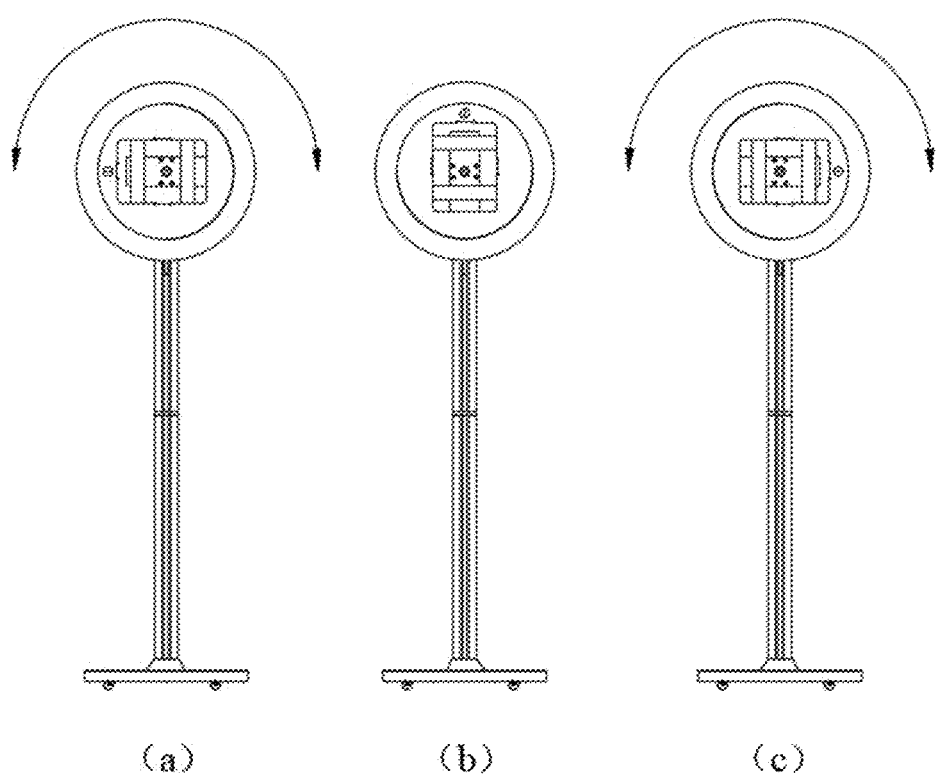
FIG. 6 is a structure diagram of the mounting member that is subject to clockwise and counterclockwise rotational adjustments in the lightweight AI-interactive-aided photographing device; wherein (a) is a state diagram of the mounting member rotated counterclockwise, (b) is a state diagram of the mounting member without clockwise and counterclockwise rotational adjustments, and (c) is a state diagram of the mounting member rotated clockwise.

As shown in FIGS. 1-3, as a preferred embodiment of the present utility model, the main rod part comprises:

an upper and lower rod sleeving member 23;

a main rod, which comprises an upper main rod 24 and a lower main rod 22, wherein the upper main rod 24 and lower main rod 22 are fixedly sleeved at both ends of the upper and lower rod sleeving member 23 respectively and fixed by screws;

a lower rod fixing member 21, which has a lower end that is fixedly arranged on the base 12, and an upper end that is in inserted connection with the lower main rod 22;

a fixed cover plate 25, which is mounted at a top end of the upper main rod 24;

a light plate 28 (with a built-in LED strip) and an acrylic diffusion plate 27, which have mounting slots that are arranged in the main rod, wherein the light plate 28 and the acrylic diffusion plate 27 can be fixedly mounted through the mounting slots, and can be assembled and disassembled quickly without screws and other fixing members 31, which greatly facilitating user installation and maintenance;

a light plate clamping member 26, which is fixedly mounted on an inner side of the upper main rod 24 and used to fix the light plate 28 and the acrylic diffusion plate 27 in the upper main rod 24, so as to prevent shaking.

Fixing holes 29 at both ends of the upper main rod 24 and the lower main rod 22 are suitable for fixing the lower rod fixing member 21, the upper and lower rod sleeving member 23, and the fixing cover plate 25, so as to keep the fixing manner of the product consistent and make it simple to mount. The upper and lower rod sleeving member 23 and the light plate clamping member 26 are provided with fixing slots for the light plate 28 and the acrylic diffusion plate 27, which realizes further fixation of the light plate 28 and the acrylic diffusion plate 27 and effectively prevents the light plate 28 and the acrylic diffusion plate 27 from shaking.

As shown in FIGS. 1-6, as a preferred embodiment of the present utility model, the mounting part comprises:

a fixing member 31, at both ends of which two screw bearings are arranged, wherein the screw bearings have a size in line with the mounting slots of the main rod, which facilitates the LED fill light 41 sliding up and down in the main rod through the fixing member 31;

a damping rotating shaft 33, through which the mounting member 4 is mounted on the fixing member 31, wherein a rotational limit design is arranged on a back face of the mounting member 4;

a coil spring 32, which is arranged on a rear side of the mounting member 4, configured to be adapted to the weight of the mounting member 4, and used in cooperation with the screw bearings on both sides of the fixing member 31, which can achieve the ascending and descending effects, wherein strokes of ascent and descent of the fixing member 31 is difference between mounting heights of the fixing cover plate 25 and the light plate clamping member 26, and it can be stopped at any point of the stroke height during the ascent or descent to effectively prevent falling down;

In the embodiment of the present utility model, through the damping rotating shaft 33, the LED fill light 41 can be subject to forward, backward, clockwise, and counterclockwise rotational adjustment. As a rotational limit design is arranged on the back of the LED fill light 41, the clockwise and counterclockwise rotational adjustment of the LED fill light 41 by 0-180 degrees can be realized through the damping rotating shaft 33, so as to realize photographing modes in multiple angles, such as vertical photographing, horizontal photographing, and diagonal photographing. The LED fill light 41 can also be replaced with a display screen 42, which increases the extended usability of the product and the optionality of the user.

The above content only relates to preferred manners of implementation of the present utility model. It should be pointed out that without departing from the concept of the present utility model, persons skilled in the art can make a plurality of transformations and improvements, which should also be deemed to fall within the scope of protection of the present utility model. These will not affect the effect of the implementation of the present utility model and the practicality of the patent.

The invention claimed is:

1. A lightweight AI-interactive-aided photographing device, comprising a base part, a main rod part, a mounting part, and a mounting member, wherein the mounting member is an LED fill light or a display screen, and a flat plate fixing panel is built in the LED fill light;

the base part comprises:
a base;
a switch, which is arranged in the base;
an AI voice module, which is arranged in the base and used to capture, analyze, and process linguistic input to create instructions; wherein the AI voice module comprises a pickup unit and a voice recognition unit, the pickup unit is used to capture speeches or sounds, and the voice recognition unit is used to receive sound data from the pickup unit, analyze and process the sound data, convert recognition results into instructions, and transmit the instructions to a control plate;
a speaker, which is arranged in the base;
a control plate, which is arranged in the base;
a base cover plate, which is arranged in a lower end of the base;
a support member, which is fixed to a lower end of the base cover plate;

the main rod part comprising:
an upper and lower rod sleeving member;
a main rod, which comprises an upper main rod and a lower main rod, wherein the upper main rod and the lower main rod are fixedly sleeved at both ends of the upper and lower rod sleeving member respectively;
a lower rod fixing member, which has a lower end that is fixedly arranged on the base and an upper end that is in inserted connection with the lower main rod;
a fixing cover plate, which is mounted at a top end of the upper main rod;
a light plate and an acrylic diffusion plate, which are fixed through mounting slots that are arranged in the main rod;
a light plate clamping member, which is fixedly mounted on an inner side of the upper main rod and used to fix the light plate and the acrylic diffusion plate in the upper main rod;

the mounting part comprising:
a fixing member;
a damping rotating shaft, through which the mounting member is mounted on the fixing member, wherein a rotational limit design is arranged on a back face of the mounting member;
a coil spring, which is arranged on a rear side of the mounting member, configured to be adapted to the weight of the mounting member.

2. The lightweight AI-interactive-aided photographing device of claim 1, wherein the support member is a wheel or a foot cup.

3. The lightweight AI-interactive-aided photographing device of claim 1, wherein fixing holes at both ends of the upper main rod and the lower main rod are suitable for fixing the lower rod fixing member, the upper and lower rod sleeving member, and the fixing cover plate.

4. The lightweight AI-interactive-aided photographing device of claim 1, wherein the upper and lower rod sleeving member and the light plate clamping member are provided with fixing slots for the light plate and the acrylic diffusion plate.

5. The lightweight AI-interactive-aided photographing device of claim 1, wherein strokes of ascent and descent of the fixing member is difference between mounting heights of the fixing cover plate and the light plate clamping member.

* * * * *